United States Patent
Oldermann et al.

[11] Patent Number: 5,860,614
[45] Date of Patent: Jan. 19, 1999

[54] COAXIAL REEL DRIVE MECHANISM

[75] Inventors: Klaus Oldermann; Martin Storz, both of Villingen-Schwenningen, Germany

[73] Assignee: Deutsche Thomson-Brandt GmbH, Villingen-Schwennigen, Germany

[21] Appl. No.: 972,872

[22] Filed: Nov. 18, 1997

[30] Foreign Application Priority Data

Dec. 19, 1996 [DE] Germany .................. 964 02 830.2

[51] Int. Cl.[6] ............................................. G11B 15/32
[52] U.S. Cl. ............................................. 242/356.1
[58] Field of Search .............................. 242/356, 356.1, 242/356.5, 356.6, 356.7; 352/156

[56] References Cited

U.S. PATENT DOCUMENTS

| | | | |
|---|---|---|---|
| 2,349,018 | 5/1944 | Tasker | 242/356.1 |
| 2,732,144 | 1/1956 | Jones | 242/356.1 |
| 2,996,264 | 8/1961 | Bygdnes | 242/356.1 |
| 3,135,475 | 6/1964 | Dodsworth | 242/356.1 |
| 3,240,440 | 3/1966 | Albers | 242/356.1 |
| 3,289,961 | 12/1966 | Glenn, Jr. | 242/356.1 |
| 3,322,364 | 5/1967 | Dekker | 242/356.1 |
| 3,363,852 | 1/1968 | Maxey | 242/356.1 |
| 3,498,569 | 3/1970 | Kjos | 242/356.1 |
| 3,552,686 | 1/1971 | Davidson | 242/356.1 |
| 3,858,828 | 1/1975 | Bundschuh et al. | 242/356.1 |
| 3,955,778 | 5/1976 | Lu | 242/356.1 |
| 4,114,831 | 9/1978 | Johnson . | |
| 4,121,786 | 10/1978 | Hathaway | 242/356.1 |
| 4,130,257 | 12/1978 | Falk | 242/356.1 |

FOREIGN PATENT DOCUMENTS 928 737  6/1955  Germany .

OTHER PUBLICATIONS

Japanese Patent Abstract 58–155560, Masao, Sep. 1983.

*Primary Examiner*—John P. Darling
*Attorney, Agent, or Firm*—Joseph S. Tripoli; Joseph J. Laks; Daniel E. Sragow

[57] ABSTRACT

A drive mechanism for driving independently a first and a second coaxial reel, uses only a single rotatable driving unit for driving both coaxial reels. Independent drive is achieved by reversing the rotation of the driving unit.

6 Claims, 2 Drawing Sheets

COAXIAL REEL DRIVE MECHANISM

The present invention relates to a drive mechanism for driving independently at least a first and a second coaxial reel.

Mechadecks featuring coaxial reels are frequently encountered in prior art. Such mechadecks may use many different solutions for driving one or both coaxial reels depending on the purpose. As an example the German Patent Application DE 4214735 A1 discloses a drive mechanism in which each coaxial reel may be driven independently. The drive mechanism comprises two driving units which drive coaxial toothed wheels having different diameters. Each toothed wheel fits in the center of a coaxial reel and drives this reel when activated by its driving unit respectively. The drive mechanism is relatively expensive, voluminous and heavy due to the two driving units.

The aim of the present invention is to find a solution for a drive mechanism which is less expensive to produce and less voluminous than drive mechanisms known from prior art. Such a solution would for example be advantageous in a portable device using a coaxial reel mechadeck.

According to the invention a solution to the above mentioned problem is given by a drive mechanism for driving independently at least a first and a second coaxial reel, each of said coaxial reels being rotatably mounted on a rotation axis, said coaxial reels being driven by a single driving unit.

Other characteristics and advantages of the invention will appear from the following description of several examples made with reference to the appended FIGS. 1 to 4.

The examples and figures are given by way of illustration only, and thus are not limitative of the present invention. Same reference numbers will be used to refer to the same items throughout the FIGS. 1 to 4.

Figure 1:
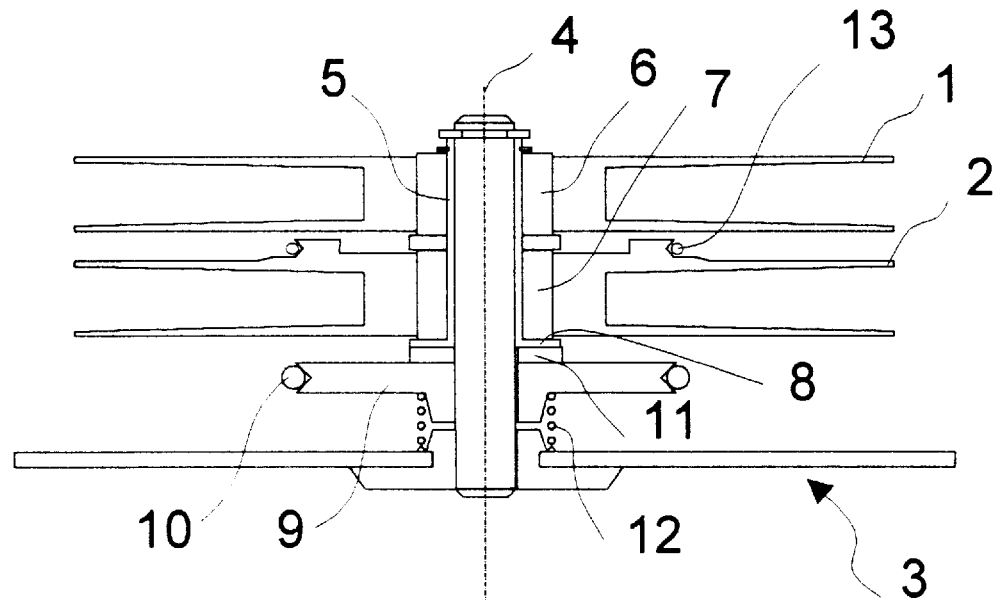
FIG. 1 shows a sectional representation of coaxial reels mounted on a rotation axis using free wheeling hubs.

FIG. 1 shows a schematic sectional view of coaxial reels 1 and 2. The coaxial reels 1 and 2 may be part of a tape mechadeck 3. The coaxial reels 1 and 2 rotate around a rotation axis 4. A shaft 5 is centered on the rotation axis 4. The coaxial reels 1 and 2 are mounted on the shaft 5 using a first and a second free wheeling hub 6 and 7. The first and second free wheeling hubs 6 and 7 have opposite directions of action. More precisely, the free wheeling hub 6 is driven when the shaft 5 is rotated in a first direction while the free wheeling hub 7 may rotate freely. On the other hand, the free wheeling hub 7 is driven when the shaft 5 is rotated in a direction opposite to the first direction while the free wheeling hub 6 rotates freely. The shaft 5 is terminated at one end by an edge 8. A pulley 9 rotates about the rotation axis 4 driven by a driving unit (not shown) through a belt 10. The pulley 9 transmits a drive force to the edge 8 of the shaft 5 through a felt ring 11. The felt ring 11 used in conjunction with a spring 12 which pushes the pulley 9 against the felt ring 11 is used as a clutch. This way the driving force transmitted to the edge 8 by the pulley 9 may be limited.

While the driving unit rotates the pulley 9 in the first direction, the coaxial reel 1 is driven through the free wheeling hub 6. At the same time, the coaxial reel 2 may be braked using a break belt 13 which is commonly known from tape mechadecks in prior art. This way, a tape (not shown) may be unwounded from the coaxial reel 2 used as a supply reel and wound on the coaxial reel 1 used as a take up reel. To rewind the tape from the coaxial reel 1 to the coaxial reel 2 the driving unit reverses the rotation sense of the pulley 9 in the opposite direction thus driving the coaxial reel 2. In this mode the braking belt 13 is released.

Figure 2:
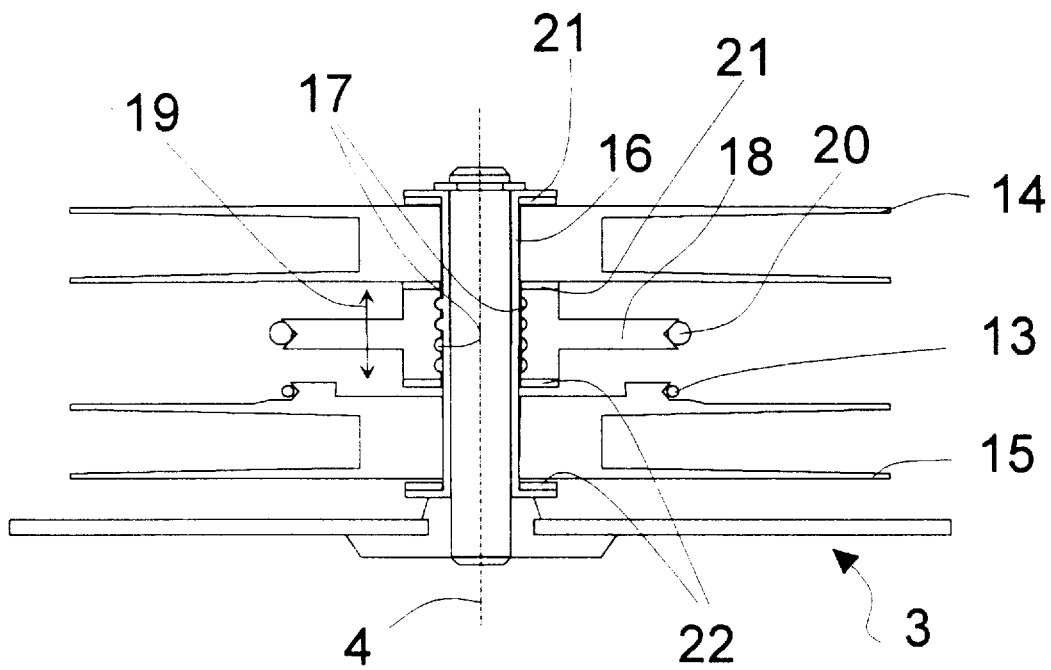
FIG. 2 shows a sectional representation of coaxial reels mounted on a rotation axis which has a threaded outer periphery.

FIG. 2 shows a sectional view of coaxial reels 14 and 15 which are rotatably mounted on a rotation axis 4. A shaft 16 is centered on the rotation axis 4. The shaft 16 has a threaded section 17 on its outer periphery between the coaxial reels 14 and 15. A pulley shaped nut 18 may be screwed along the threaded section 17 in directions shown by a double arrow 19. The pulley shaped nut 18 is driven by a driving unit (not shown) through a belt 20.

In case the pulley shaped nut 18 is rotated in a first direction it moves along the shaft 16 in direction of the coaxial reel 14 and eventually gets jammed with the coaxial reel 14. The pulley shaped nut hereby transmit driving force to the coaxial reel 14. The transmitted driving force may be limited through the use of felt rings 21 which have the function of a clutch. While the coaxial reel 14 is driven, the coaxial reel 15 may be braked using the breaking belt 13. In order to drive the coaxial reel 15 the breaking belt 13 is released and the sense of rotation of the pulley shaped nut 8 is reversed. The pulley shaped nut 18 releases its grip on the coaxial reel 14 and moves in direction of the coaxial reel 15. A corresponding driving force is transmitted to the coaxial reel 15 through a felt ring 22 as the pulley shaped nut 18 gets jammed.

Figure 3:
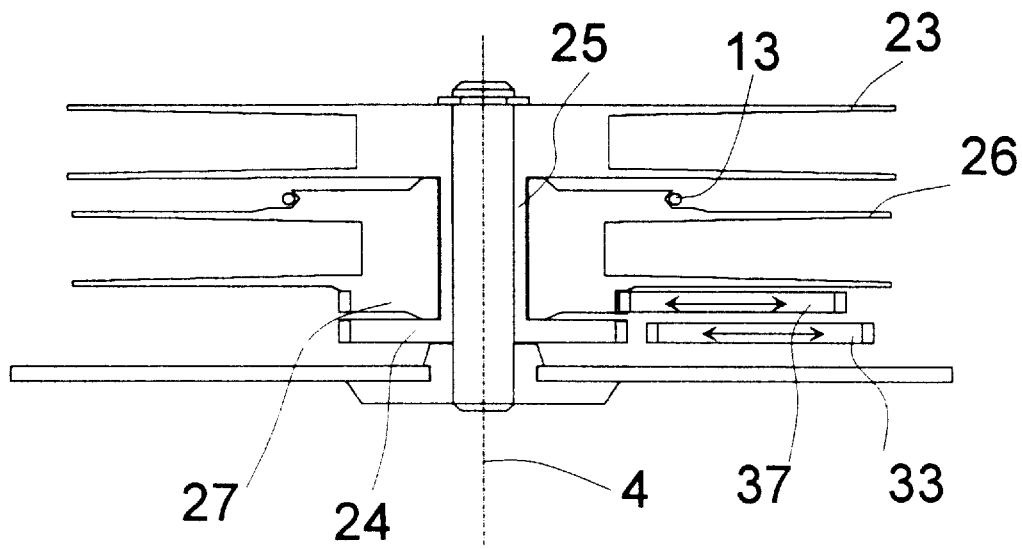
FIG. 3 shows a sectional representation of a driving mechanism using an idler gearing.

FIG. 3 shows a sectional view of a coaxial reel 23 which rotates around the rotation axis 4. The coaxial reel 23 is integral with a first toothed disk 24 through a connecting shaft 25. A coaxial reel 26 freely rotates around the connecting shaft 25. The coaxial reel 26 is integral with a toothed disk 27.

Figure 4:
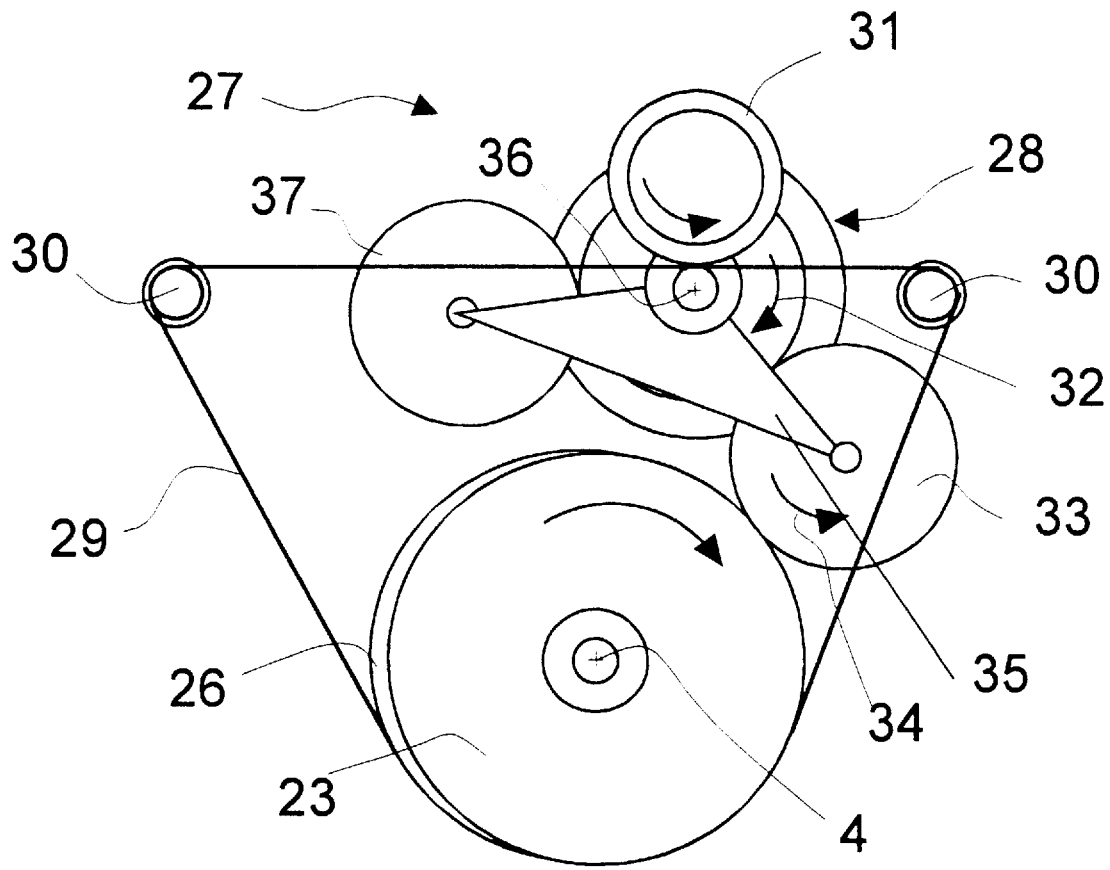
FIG. 4 shows an upper representation of a coaxial reel mechadeck using an idler gearing as part of a drive mechanism.

FIG. 4 shows an upper view of the coaxial reels 23 and 26 as used in a tape mechadeck. An idler gearing 27 is part of a driving mechanism activated by a driving unit 28. A magnetic tape 29 is transported between the coaxial reels 26 and 23 guided by tape guides 30 and transported by a capstan 31 which is also driven by the driving unit 28.

In case where the driving unit 28 is rotated in a first direction shown by the arrow 32 a satellite disk 33 is driven in a direction shown by an arrow 34. At the same time a lever 35 on which the satellite disk 33 is mounted swings around an axis 36 bringing the satellite disk 33 in contact with the toothed disk 24. The tape is now being wound on the coaxial reel 23 used as a take up reel. The tape may be rewound on the coaxial reel 26 by inverting the sense of rotation of the driving unit 28. The lever 35 swings around the axis 36 bringing a satellite disk 37 mounted on the lever 35 in contact with the toothed disk 27 to drive the coaxial reel 26. In a similar way as described above for the mechanisms in FIG. 1 and FIG. 2. A braking belt 13 may be used to brake the coaxial reel 26.

The drive mechanisms shown in FIGS. 1 to 4 may advantageously be used in compact portable consumer products, such as for example magnetic tape recording and/or reading devices. The drive mechanisms according to the invention require only a minimum of space. The use of a single driving unit, typically en electric motor, allows to keep production costs at a relatively low level.

We claim:

1. A drive mechanism for driving first and second coaxial reels, each of said coaxial reels being rotatably mounted on a rotation axis, comprising means including a single rotatable driving unit for independently driving each of said reels in response to reversal of the direction of rotation of said driving unit.

2. A drive mechanism according to claim 1 characterized in that, said driving unit activates said rotation axis (5) in either a first or a second direction, said first (1) and said second (2) coaxial reels are mounted on said rotation axis using respectively a first (6) and a second (7) free wheeling hub, said free wheeling hubs having opposite directions of action and being driven through said rotation axis when the driving unit activates said rotation axis.

3. A drive mechanism according to claim 2 characterized in that, said driving unit activates said rotation axis through a belt driven pulley (9), said belt driven pulley being mounted on said rotation axis.

4. A drive mechanism according to claim 1 characterized in that said rotation axis is threaded on its outer periphery (17) such that at least one disk shaped nut (18) may be screwed on said threaded outer periphery, said disk shaped nut being activated by said driving unit in either one of a first or a second direction and said disk shaped nut getting jammed with either said first (14) or said second (15) coaxial reel depending on said first or said second direction it is activated in, such as to drive said first or said second coaxial reel.

5. A drive mechanism according to claim 4 characterized in that said disk shaped nut is a belt driven pulley (18).

6. A drive mechanism according to claim 1 characterized in that said first (23) and said second (26) coaxial reels are respectively integral with a first (24) and second (27) disk shaped part centered on said rotation axis, said driving unit (28) being used to activate an idler gearing (27) having at least two satellite disks (33,37) which are respectively used to activate said first and said second disk shaped part depending on a direction of rotation of said driving unit, thus driving said first or said second coaxial reel.

* * * * *